Nov. 5, 1929.    J. A. E. CARLSON    1,734,713
POWER MOWER
Filed June 13, 1927    3 Sheets-Sheet 1

INVENTOR.
John A. E. Carlson
BY
ATTORNEYS.

Nov. 5, 1929.  J. A. E. CARLSON  1,734,713
POWER MOWER
Filed June 13, 1927   3 Sheets-Sheet 2
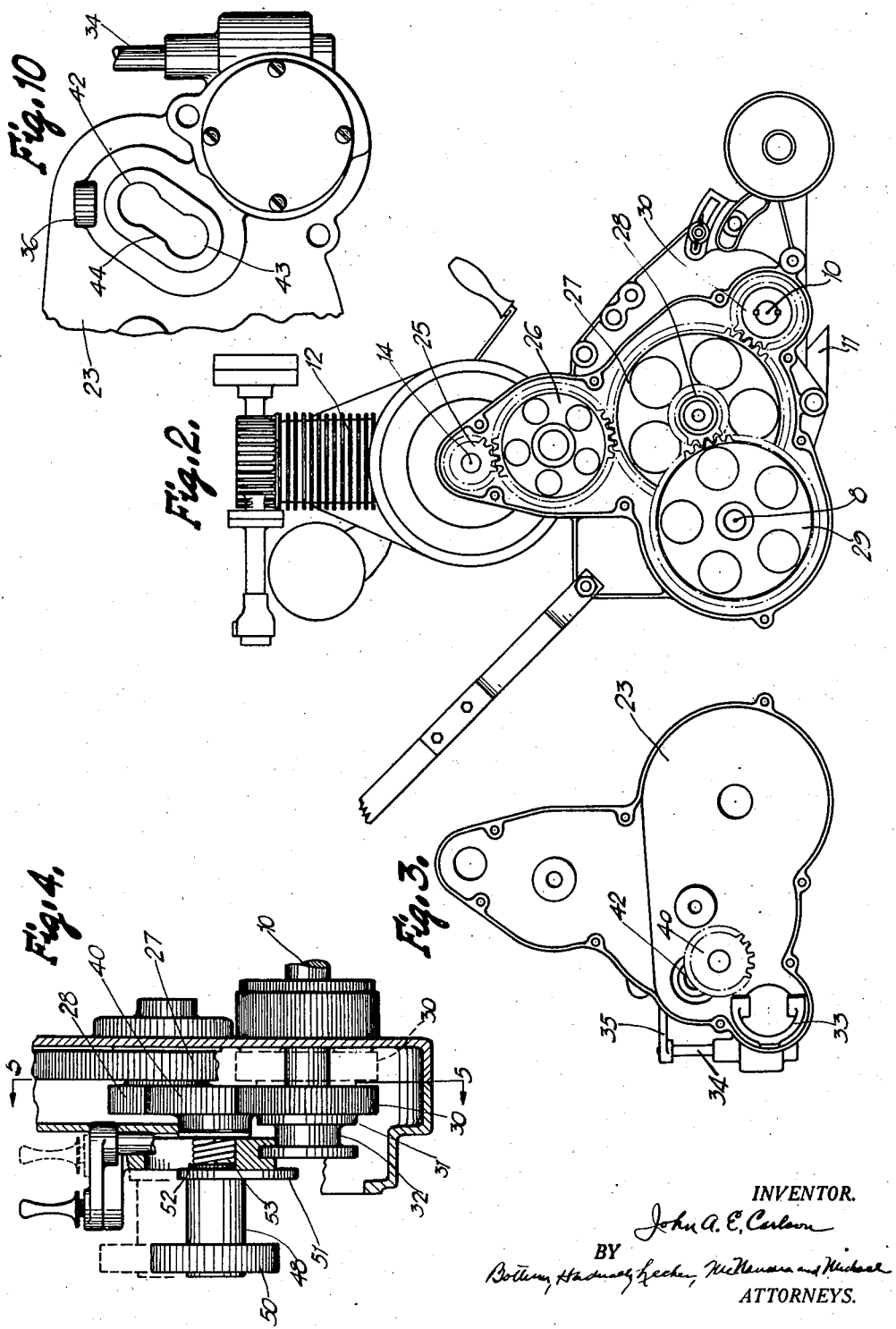
INVENTOR.
John A. E. Carlson
BY
ATTORNEYS.

Nov. 5, 1929.  J. A. E. CARLSON  1,734,713
POWER MOWER
Filed June 13, 1927  3 Sheets-Sheet 3

INVENTOR.
*John A. E. Carlson*
BY
*Bollman, Hudnall, Lecher, McKenna and Michael*
ATTORNEYS.

Patented Nov. 5, 1929

1,734,713

UNITED STATES PATENT OFFICE

JOHN A. E. CARLSON, OF RACINE, WISCONSIN, ASSIGNOR TO JACOBSON MANUFACTURING COMPANY, OF RACINE, WISCONSIN, A CORPORATION OF WISCONSIN

POWER MOWER

Application filed June 13, 1927. Serial No. 198,317.

This invention relates to a power mower specially designed for use in cutting the grass of putting greens, lawns, or the like, although also well adapted for various other uses.

One of the objects of the invention resides in the provision of a power mower of simple construction, the mower preferably embodying but a single clutch, and yet the desired control and selection with respect to the operation or driving of the traction means and cutting means is had. Thus, with the present invention the traction means and the cutting means may be driven simultaneously for cutting the grass or when travelling from place to place, the traction means may be driven and the cutting means permitted to remain idle.

Another object is to provide a self-contained reversing mechanism for reversely driving the cutting reel of the cutting means for sharpening the same. The reversing means is so organized with the driving mechanism as to utilize the elements thereof in effecting reversal of the cutting wheel, and one of the chief advantages of the novel reversing mechanism resides in the fact that changing or addition of sprockets, sprocket chains, gear or other similar parts, is avoided, the simple shifting of the reversing gear and the proper adjustment of the pinion of the cutting reel shaft bringing about the desired reversal. Moreover, the direct or forward drive for the cutting wheel and its reversing mechanism are in a sense interlocked so that it is impossible to set both for simultaneous operation and thus cause one to interfere with the operation of the other or to damage the machine.

Another object resides in the provision of a power mower having these advantages and capacities and which is of simple and durable construction, reliable and effective in operation, easy to control and comparatively inexpensive to manufacture.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 2 is a fragmentary view in side elevation showing the power mower of Figure 1, the cover plate of the gear casing and the parts carried thereby being removed for the sake of illustration;

Figure 3 is a view in elevation of the cover plate of the gear casing and the parts carried thereby, the interior of the cover plate of the gear casing being exposed to view;

Figure 4 is a fragmentary view in front elevation showing the shiftable pinion for controlling the drive of the cutting reel and also the reversing gear, the casing being broken away in shown section, and the shifting means for the pinion also being broken away, all for the sake of illustration;

Figure 10 is a fragmentary view in elevation showing the spaced seats in the cover of the gear casing for the mounting of the reversing gear.

Figure 1:
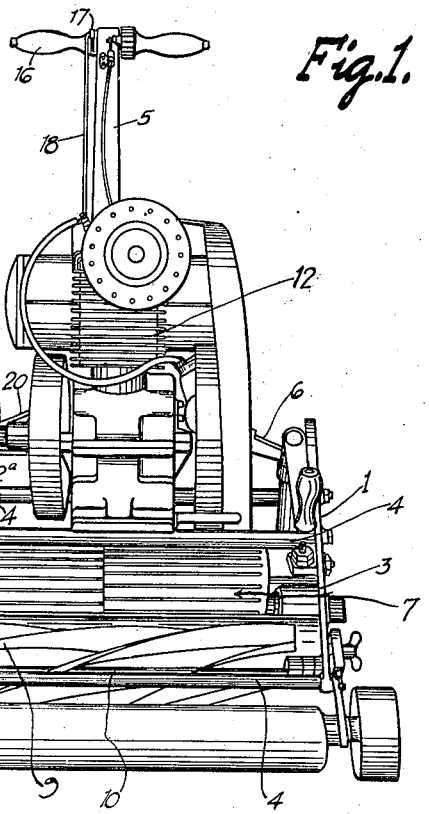
Figure 1 is a perspective view looking toward the forward end of a power mower embodying the present invention.
Figure 9:
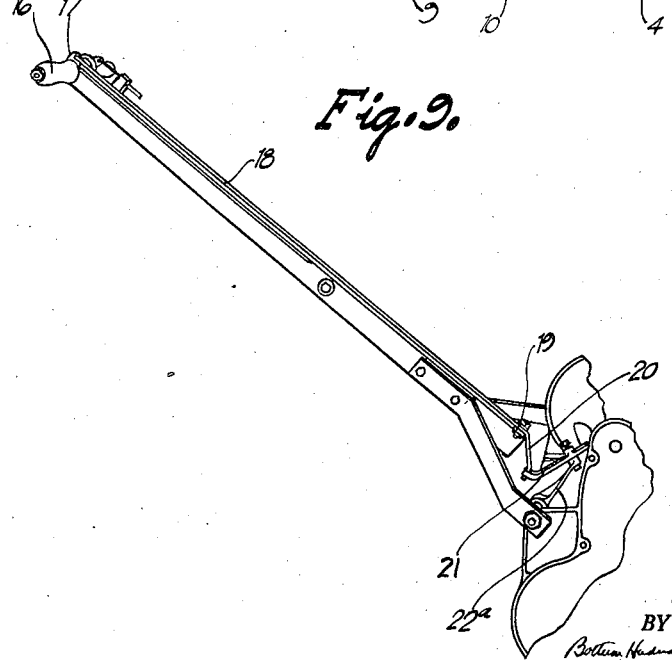
Figure 9 is a fragmentary perspective view illustrating the operating mechanism for the clutch.

Referring to the drawings, it will be seen that the power mower comprises a frame designated generally at 1, and which may be of any suitable construction. Preferably, the frame includes side plates 2 and 3 rigidly connected and maintained in proper spaced relation by suitable cross rods 4 extending transversely between the side plates and suitably fastened thereto.

A handle 5 is provided and has a yoke or bail 6 connected to the side plates of the frame. Suitable traction means is provided for the frame, and in the present instance consists of a traction drum assembly 7 fixed to a shaft 8, the ends of the shaft projecting beyond the traction drum assembly and being rotatably mounted in the side plates of the frame. Forwardly of the traction drum assembly cutting means is provided and may comprise a cutting reel 9 fixed on the cutting reel shaft 10, the ends of the cutting reel shaft 10 being rotatably fitted in the side plates of the frame. The cutting reel 9 coacts with a ledger plate 11 adjustably and yieldably supported on the side plates of the frame.

An internal combustion engine designated generally at 12 is mounted on the frame and has an engine shaft 13 operatively connected with the driving shaft 14 by means of a clutch 15. The clutch 15 is manipulated from a control sleeve 16 mounted on the handle 5 and having a crank arm 17 connected through rod 18 to a short lever 19 which through a cross rod 20 connects with the lever arm 21 of a shifting fork 22, the shifting fork being fulcrumed on a bracket arm 22ᵃ and coacting with the clutch in any approved manner. In the present instance the shifting fork coacts with the slidable expanding collar 21ᵃ, the expanding collar 21ᵃ in turn coacting with the expanding mechanism for the expansible internal member of the clutch. The specific clutch structure per se forms no part of this invention and may be of any type. The control mechanism for the shifting fork is fully shown, described and claimed in my copending applications filed May 17, 1926, Serial No. 109,491, and July 12, 1926, Serial No. 121,764.

The drive shaft 14 is rotatably mounted in a bearing provided therefor in the side plate 2 of the frame, and this shaft 14 projects through the side plate 2 and into the interior of a gear casing constituted by the side plate and a cover plate 23, the side plate 2 and the cover plate 23 having confronting marginal flanges which engage in the assembly in order to provide sufficient space within the gear casing to accommodate the various instrumentalities contained therein. Suitable fastening means are provided for securing the cover plate 23 to the side plate 2.

Gearing is provided between the drive shaft 14 and the shaft 8 of the traction drums for constantly driving the traction drums whenever the driving shaft 14 is actuated. This gearing includes a pinion 25 fixed to the shaft 14 and meshing with a gear wheel 26 rotatably mounted on the side plate 2, the gear 26 meshing with and driving a relatively large gear wheel 27. A pinion 28 and the gear wheel 27 are constrained to rotate together and are mounted for rotation about the same axis on the side plate 2. The pinion 28 meshes with the gear wheel 29 fixed to the end of the shaft 8 of the drum assembly which projects into the gear casing.

A shiftable pinion 30 is splined on the end portion of the cutting reel shaft 10 that projects into the gear casing. This pinion 30 in one position meshes with the gear wheel 27, but in its other position is disposed beyond the plane of this gear wheel 27 and out of mesh therewith. In this way the cutting reel may be driven when the traction drums are driven, or the cutting wheel may be permitted to remain idle and stationary while the traction drums are driven.

Figure 5:
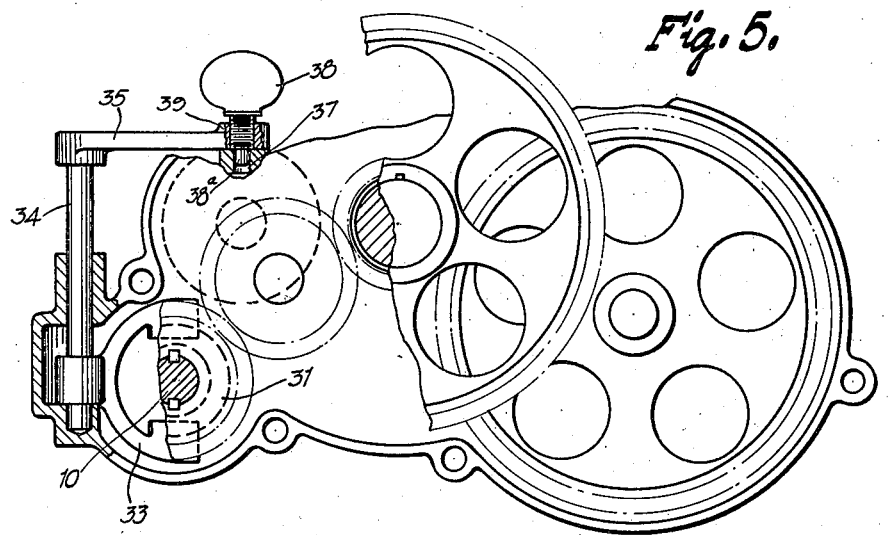
Figure 5 is a view in section taken on line 5—5 of Figure 4 and looking in the direction of the arrows, parts being broken away and parts being shown in elevation for the sake of illustration.
Figure 6:
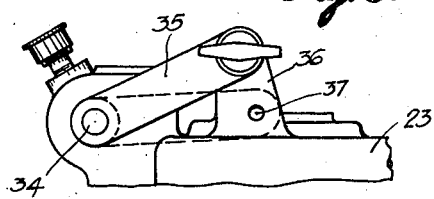
Figure 6 is a fragmentary plan view showing the operating means and locking device for the shifting fork of the pinion of the cutting wheel shaft.

In order to provide for the convenient shifting of the pinion 30 and for securing the same in either of its adjustments, this pinion 30 has a hub extension 31 provided with an annular or peripheral groove 32. A shifting fork 33 coacts with the peripheral or annular groove 32 of the hub extension of the pinion 30. This shifting fork 33 is fixed to a vertical shaft 34 rotatably mounted in bearings provided therefor on the cover plate 23 (see Fig. 5) and projects exteriorly of the cover plate. The projecting portion of the shaft 34 has an operating arm 35 fastened thereto. The end portion of the arm 35 remote from the shaft 34, overhangs a laterally projecting lug 36 integral with the cover plate 23. Spaced recesses 37 are formed in this lug 36 and are designed to receive the reduced lower end 38ᵃ of a locking screw or thumb screw 38 threadedly mounted as at 39 in the outer end of the operating arm 35. By turning the locking screw 38 its end 38ᵃ may be engaged with or disengaged from the underlying recess 37. When the locking screw is turned to raise its lower end 38ᵃ above the lug 36, the handle 35 may be swung in either direction to cause the pinion 30 to engage with the gear 27 or to be disengaged therefrom. The pinion 30 is locked in either position by turning the thumb screw 38 to engage its lower end 38ᵃ with the underlying recess 37.

Figure 8:
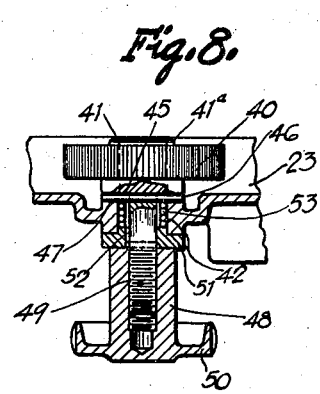
Figure 8 is a view in section on line 8—8 of Figure 7.
Figure 7:
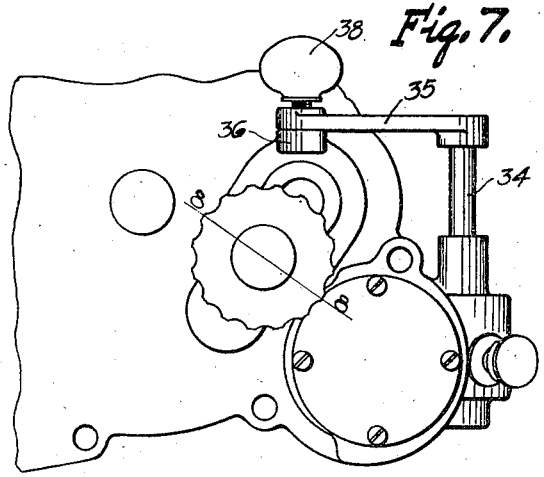
Figure 7 is a fragmentary view in side elevation illustrating the mechanism of Figure 6 and also the associated mechanism.

When the pinion 30 is meshed with the gear 27, it is of course, located in the plane of the gear as illustrated in dotted lines in Figure 4. On the other hand, when the pinion 30 is shifted to idle position it is disposed to one side of the gear wheel 27 and in the plane of the gear wheel 28. A reversing pinion 40 is provided and is rotatably fitted on a stud 41, mounted on the cover plate 23. The cover plate 23 is provided with spaced seats 42 and 43 and also has a slot 44 between the seats 42 and 43 to permit the stud 41 to be moved from either of the seats to the other. One end of the stud 41 has a head 41ᵃ to prevent endwise displacement of the pinion 41 in one direction. Contiguous with the portion of the stud on which the reversing gear 40 is rotatably fitted, the stud has a shoulder 45 providing an abutment for the washer 46 interposed between the shoulder 45 and inner end 47 of each of the seats. The stud 41 is firmly clamped against either of the seats 42 or 43 by means of a sleeve nut 48 threadedly engaged with the stud as at 49 (see Fig. 8), and having a hand wheel 50 at one end to facilitate manipulation thereof. A lock washer 51 is splined on the stud 41 as indicated at 52, and is interposed between the inner end of the sleeve nut 48 and the seat 42 or 43 in which the stud is mounted. This lock washer 51 has an inwardly directed annular flange or boss 52 designed to snugly fit in either seat 42 or 43. The washer 51 is sufficiently elongated to cover not only the seat in which the stud 41 is mounted, but also the slot 44 and the other seat. To insure easy removal of the parts an expansible coil spring 53 may be interposed between the washer 46 and the lock washer 51.

When the stud 41 is clamped in the seat 42 the reversing gear 40 is held in idle position and cannot engage the pinion 30. By loosening the sleeve nut 48 to such an extent as to disengage the boss 52 of the lock washer 51 from the seat 42, the entire reversing gear assembly may be lowered to the seat 43 and may be clamped to this seat by introducing the boss of the lock washer into the seat 43 and fastening these parts by tightening up the sleeve nut 48. By splining the lock washer 51 to the stud 41 the stud is prevented from turning with the nut 48 when the nut is being tightened or loosened. In this adjustment the reversing gear 40 not only engages the gear wheel 28, but is also positioned to engage the gear wheel 30, when the gear wheel 30 is shifted outwardly to the position shown in full lines in Fig. 4. In this adjustment of the parts the cutting reel will be driven reversely across the lever plate as is desirable for sharpening.

From the foregoing it will be understood that with the present invention but a single clutch is provided and yet the cutting means may be driven simultaneously with the traction means, or the cutting means may be left idle while the traction means is driven. The cutting means cannot be driven and the traction means left idle, and this is a decided advantage in certain uses. For instance, in cutting putting greens, serious damage has sometimes been done to the greens by letting the cutting reel spin with the traction means idle. Under such circumstances the machine settles and the cutting reel eats its way down into the green, thereby tearing up and damaging the same. This cannot occur with applicant's mower and yet in travelling from place to place, as for instance from green to green, the cutting reel may be disconnected from the drive and may remain idle although the traction means is operated. The reversing mechanism is self-contained within the machine. No gears need be changed nor gears or sprocket wheels or chains added. All that it is necessary to do is to properly manipulate the shifting fork of the gear 30 and the sleeve nut and locking washer of the mounting for the reversing gear. The same pinion which drives the cutting reel forwardly is a part of the reversing mechanism, and this pinion must be shifted out of driving relation with the direct drive before the machine can be reversed. Thus, in a broad sense the forward and reverse mechanisms are interlocked.

The invention claimed is:

1. A power mower comprising a frame, traction means, cutting means, a motor, a drive shaft, a clutch controlling the connection of the motor and of the drive shaft, gearing for constantly driving the traction means from the drive shaft, and a shiftable pinion between the gearing and the cutting means, said pinion in one position serving to drive the cutting means from the gearing and in its other position disconnecting the cutting means from the gearing whereby the cutting means remains idle while the traction means is actuated.

2. A power mower comprising a frame, traction means, cutting means, a motor, a drive shaft, a clutch controlling the connection of the motor and of the drive shaft, gearing for constantly driving the traction means from the drive shaft, a shiftable pinion operatively connected to the cutting means in all adjustments and positionable to engage the gearing and to be driven therefrom to impart cutting movement to the cutting means, said pinion also being positionable to disengage the gearing to permit the cutting means to idle, and an adjustable reversing gear positioned in one adjustment to be operatively connected with the gearing and to mesh with the shiftable pinion when the shiftable pinion is disengaged from the gearing whereby the cutting means may be reversely driven for sharpening.

3. A power mower comprising a frame, traction means, cutting means including a cutting reel having a cutting reel shaft rotatably mounted on the frame, driving mechanism constantly connected to the traction means, and a shiftable pinion splined on the cutting reel shaft and positionable to be driven by the driving mechanism and also positionable to disengage the driving mechanism and permit the cutting reel to remain idle.

4. A power mower comprising a frame, traction means, cutting means including a cutting reel having a cutting reel shaft rotatably mounted on the frame, driving mechanism constantly connected to the traction means, a shiftable pinion splined on the cutting reel shaft and positionable to be driven by the driving mechanism and also positionable to disengage the driving mechanism and permit the cutting reel to remain idle, and adjustable reversing means mounted on the frame and positioned in one adjustment to be operatively connected to the driving mechanism and to be engaged with said pinion when said pinion is disengaged from the driving mechanism.

5. A power mower comprising a frame, a cutting reel having a cutting reel shaft rotatably mounted on said frame, driving mechanism, a shiftable pinion splined on the cutting reel shaft and positionable to be operatively engaged with the driving mechanism and also positionable to be disengaged therefrom, manually operable means for shifting the pinion, and a locking device for the manually operable means whereby the pinion may be releasably locked in either of its two positions.

6. A power mower comprising a frame, a cutting reel having a cutting reel shaft rotatably mounted on said frame, driving mechanism, a shiftable pinion splined on the cutting reel shaft and positionable to be operatively engaged with the driving mechanism and also positionable to be disengaged therefrom, and manually operable means for shifting the pinion.

7. A power mower comprising a frame having a gear casing at one side, a cutting reel having a cutting reel shaft rotatably mounted on said frame, and extending through the gear casing thereof, driving mechanism including gearing in the gear casing, a shiftable pinion splined on the cutting reel shaft within the gear casing and positionable to engage with the gearing and also positionable to be disengaged therefrom, a shifter within the gear casing and operatively engaged with the pinion, an operating member for the shifter projecting exteriorly of the casing, and a device for releasably locking the operating member in either of its two extreme positions.

8. A power mower comprising a frame having a gear casing at one side, a cutting reel having a cutting reel shaft rotatably mounted on said frame and extending through the gear casing thereof, driving mechanism including gearing in the gear casing, a shiftable pinion splined on the cutting reel shaft and having a cutting reel driving position wherein it meshes with the gearing and also having an idle position wherein it is disengaged from the gearing, a reversing gear, a mounting for the reversing gear adjustably supported on said gear casing and adapted in one of its adjustments to maintain the reversing gear operatively engaged with the gearing and positioned to engage the pinion when the pinion is in its idle position whereby the cutting reel may be reversely driven, said mounting in another position on the casing disengaging the reversing gear from the pinion.

9. A power mower comprising a frame having a gear casing at one side, a cutting reel having a cutting reel shaft rotatably mounted on said frame and extending through the gear casing thereof, driving mechanism including gearing in the gear casing, a shiftable pinion splined on the cutting reel shaft and having a cutting reel driving position wherein it meshes with the gearing and also having an idle position wherein it is disengaged from the gearing, a reversing gear, a mounting for the reversing gear, said gear casing having spaced seats for the mounting and also having a slot connecting said seats, releasable means for holding the mounting in either seat, said mounting in one seat maintaining the reversing gear in operative engagement with the gearing and in position to engage the pinion in its idle position whereby the cutting reel may be reversely driven, said mounting in the other seat maintaining the reversing gear disengaged from the pinion.

10. A power mower comprising a frame having a gear casing at one side, a cutting reel having a cutting reel shaft rotatably mounted on said frame and extending through the gear casing thereof, driving mechanism including gearing in the gear casing, a shiftable pinion splined on the cutting reel shaft and having a cutting reel driving position wherein it meshes with the gearing and also having an idle position wherein it is disengaged from the gearing, a reversing gear, a stud shaft on which the reversing gear is rotatably mounted, said gear casing having spaced seats and also having a slot connecting said seats to permit the stud shaft to be shifted from one to the other, and releasable means for securing the stud shaft to either seat, said stud shaft when engaged with one seat maintaining the reversing gear in operative engagement with the gearing and in position to engage the pinion in its idle position whereby the cutting reel is reversely driven, said stud shaft when engaged with the other seat maintaining the reversing gear disengaged from the pinion.

11. A power mower comprising a frame, traction means, cutting means, a motor, a drive shaft, a clutch for controlling the connection of the motor and the drive shaft, gearing for constantly driving the traction means from the drive shaft, and controllable means for connecting and disconnecting the gearing and the cutting means whereby the cutting means may be driven simultaneously with the traction means and whereby the cutting means may be permitted to remain idle while the traction means is driven.

12. A power mower comprising a frame having a gear casing at one side, a cutting reel having a cutting reel shaft rotatably mounted on said frame and extending through the gear casing thereof, driving mechanism including gearing in the gear casing, a shiftable pinion splined on the cutting reel shaft and having a cutting reel driving position wherein it meshes with the gearing and also having an idle position wherein it is disengaged from the gearing, a reversing gear, a stud shaft on which the reversing gear is rotatably mounted, said gear casing having spaced seats and also having a slot connecting said seats to permit the stud shaft to be shifted from one to the other, and releasable means for securing the stud shaft to either seat, including a lock washer mounted on the stud and having means selectively engageable with either seat, and a nut threaded on the stud and engageable with the lock washer, said stud shaft when engaged with one seat maintaining the reversing gear in operative engagement with the gearing and in position to engage the pinion in its idle position whereby the cutting reel is reversely driven, said stud shaft when engaged with the other seat maintaining the reversing gear disengaged from the pinion.

13. A power mower comprising a frame having a gear casing at one side, a cutting reel having a cutting reel shaft rotatably mounted on said frame and extending through the gear casing thereof, driving mechanism including gearing in the gear casing, a shiftable pinion splined on the cutting reel shaft and having a cutting reel driving position wherein it meshes with the gearing and also having an idle position wherein it is disengaged from the gearing, a reversing gear, a stud shaft on which the reversing gear is rotatably mounted, said gear casing having spaced seats and also having a slot connecting said seats to permit the stud shaft to be shifted from one to the other, and releasable means for securing the stud shaft to either seat, including a lock washer mounted on the stud and having means selectively engageable with either seat, a nut threaded on the stud and engageable with the lock washer, and means for forcing the lock washer away from the seat with which it is engaged when the nut is loosened.

14. A power mower comprising a frame having a gear casing at one side, a cutting reel having a cutting reel shaft rotatably mounted on said frame and extending through the gear casing thereof, driving mechanism including gearing in the gear casing, a shiftable pinion splined on the cutting reel shaft within the gear casing and positionable to engage the gearing and also positionable to be disengaged therefrom, said pinion having a hub formed with the annular groove, a shifting fork cooperable with the groove of the hub, a shaft carrying said fork, said shaft being mounted on said gear casing and projecting exteriorly thereof, an arm fixed to the shaft exteriorly of the gear casing, a lug fixed to the gear casing and cooperatively disposed with respect to said arm, said lug having a plurality of spaced recesses, and a releasable locking member mounted on the arm and selectively engageable with the recesses of the lug.

15. A power mower comprising a frame, traction means, cutting means including a cutting reel having a cutting reel shaft rotatably mounted on the frame, driving mechanism constantly connected to the traction means, a shiftable pinion splined on the cutting reel shaft and positionable to be driven by the driving mechanism and also positionable to disengage the driving mechanism and permit the cutting reel to remain idle and an adjustable reversing gear mounted on the frame for adjustment in the plane of the driving mechanism and adapted, in one adjustment, to be interconnected with the driving mechanism and to be meshed with the pinion when the pinion is shifted to a position wherein it is disengaged from the driving mechanism.

In witness whereof, I hereto affix my signature.

JOHN A. E. CARLSON.